United States Patent [19]

Smith

[11] 3,878,510

[45] Apr. 15, 1975

[54] ADDRESSABLE SWITCH WITH VARIABLE INTERVAL BLINDING

[75] Inventor: James Warren Smith, Middletown, N.J.

[73] Assignee: Bell Telephone Laboratories, Incorporated, Berkeley Heights, N.J.

[22] Filed: May 2, 1974

[21] Appl. No.: 466,191

[52] U.S. Cl. .......................... 340/147 R; 340/163

[51] Int. Cl. .......................... H04q 9/00

[58] Field of Search .......... 340/147 R, 163, 152 R, 340/151 R; 178/2, 3

[56] References Cited

UNITED STATES PATENTS

| | | | |
|---|---|---|---|
| 2,193,967 | 3/1940 | Kleinschmidt | 178/3 |
| 3,001,010 | 9/1961 | Mahony | 178/2 |
| 3,529,293 | 9/1970 | Sullivan | 340/163 |

*Primary Examiner*—Harold I. Pitts
*Attorney, Agent, or Firm*—Roy C. Lipton

[57] ABSTRACT

An addressable switch completes a signaling path between a central station and a selected one of a plurality of remote terminals in response to a control word from the central station. Thereafter the addressable switch blinds itself to signals on the signaling path for a delay interval defined by select bits of the control word. Information is carried on the completed signaling path between the central station and the selected remote terminal during the interval in which the addressable switch is blinded. At the termination of the interval, the signaling path is broken and the addressable switch is unblinded in preparation for subsequent control words. In a tandem switch arrangement, a primary addressable switch completes a signaling path between the central station and a secondary addressable switch in response to a first control word. While the primary addressable switch is blinded, the secondary addressable switch extends the signaling path to a selected one of a plurality of remote terminals in response to a second control word. The primary and secondary addressable switches remain blinded while information is exchanged between the central station and the selected remote terminals.

15 Claims, 2 Drawing Figures

ADDRESSABLE SWITCH WITH VARIABLE INTERVAL BLINDING

FIELD OF THE INVENTION

This invention relates to switching circuits for connecting a central station to a selected one of a plurality of remote locations and more particularly, to a switching circuit which is operated by address signals from the central station.

DESCRIPTION OF THE PRIOR ART

In communications systems, it is often desirable to access remote locations from a central station. Known methods of accomplishing remote location access include the use of an addressable switch for selectively completing a signaling path between the central station and a selected one of a plurality of remote locations. In such a system, the central station transmits a control word, having remote location address information, to the addressable switch. The switch operates in response to this information and completes a signaling path between the central station and the addressed remote location, thereby allowing an interchange of information to occur between them.

A problem in such systems is the possibility that the addressable switch may respond to other than valid address information. For example, during normal communication between the central station and the remote location, a bit sequence identical to an address of another location may be imbedded in a normal message. The switch would operate in response to this bit sequence thereby prematurely breaking the signal path. Alternatively, the switch could respond to transmission errors simulating a bit sequence that equals a location address and operate prematurely. Prior art methods of preventing this type of erroneous switch operation have included the elimination of characters from the signaling format which are identical to addresses and the use of various error checking schemes at the switch. These methods have resulted in the need for restraints on the signaling formats and for additional complex hardware at the switch.

It is therefore a broad object of this invention to provide an improved means that prevents erroneous switch operation.

It is a further object of this invention to eliminate the need for restraints on the signaling formats.

It is an additional object of this invention to reduce the complexity of the hardware previously required at the switch.

A known modification of the above-described system includes the use of tandem addressable switches. In this arrangement, the central station addresses a primary addressable switch which operates to complete a signaling path between the central station and a secondary addressable switch. Remote location address information is then transmitted to the secondary switch which operates to complete a signaling path between the addressed remote location and the central station via the primary and secondary switches. Inherent in such an arrangement, is the necessity to render the primary switch unresponsive to secondary switch addresses. In the prior art, this was accomplished by excluding the secondary switch's set of addresses from the primary switch address set. This reduced the number of address combinations available to the primary switch.

It is therefore a further object of this invention to render a primary switch unresponsive to secondary switch addresses without restricting the primary switch address set.

SUMMARY OF THE INVENTION

In accordance with the invention, the addressable switch, after completing the signaling path to the addressed location, blinds itself to signals on the signaling path for an interval of time which exceeds the time required to complete the information interchange between the central station of the selected remote location. Switch operation is therefore precluded during the information interchange.

It is a feature of this invention that, in addition to the remote location address information, the control word also has delay interval information which defines the interval of time required to complete the interchange of information. The addressable switch is arranged to blind itself for the interval of time defined by the delay interval information.

It is a further feature of the invention that the signaling path is broken and the addressable switch is unblinded at the conclusion of the delay interval.

It is another feature of the invention that the duration of the delay interval is determined by advancing a binary counter from a start count state defined by the delay interval information to a fixed stop count state.

In accordance with the illustrative embodiment of the invention disclosed herein, the system comprises a tandem switch arrangement wherein the central station sends a first control word having a first set of address information and delay interval information to a primary switch and a second control word having a second set of address information and delay interval information to a secondary switch. The first word delay interval information defines an interval of time which exceeds the time required to address the secondary switch and to complete the information interchange between the central station and the remote location. The primary switch is thus blinded to signals on the signaling path during the interval in which the secondary switch is addressed and during the information interchange between the central station and the remote location selected by the secondary switch.

The foregoing and other objects and features of this invention will be more fully understood from the following description of an illustrative embodiment thereof in conjunction with the accompanying drawings.

DETAILED DESCRIPTION

Figure 1:
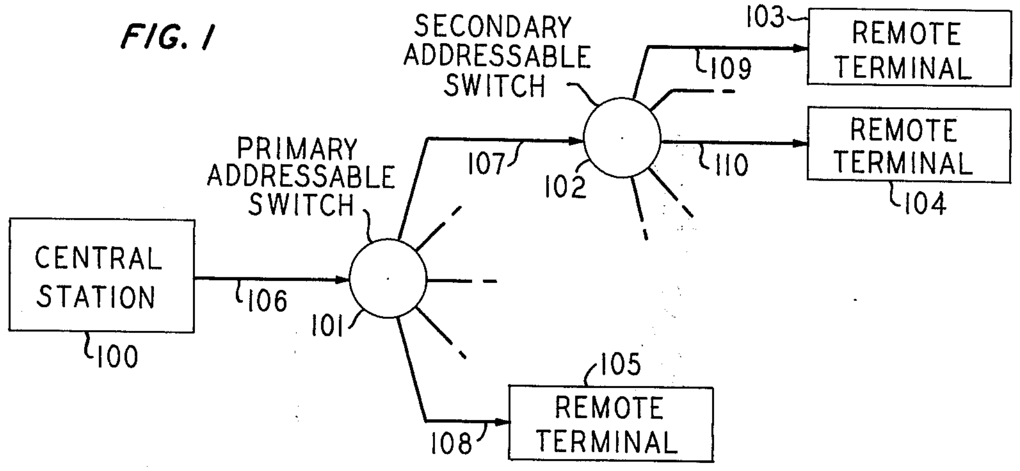
FIG. 1 discloses, in block form, the interconnection of a central station and remote terminals utilizing addressable switches in accordance with the invention.

Refer to FIG. 1. Shown therein is an arrangement whereby a central station 100 can access a plurality of remote locations, such as remote terminal 105, or secondary switch 102. Additional remote locations, such as remote terminals 103 and 104 are accessed via secondary addressable switch 102. Central station 100 is connected to addressable switch 101 by line 106; addressable switch 101 is connected to secondary switch 102 by line 107; and individual lines extend to each remote terminal, such as lines 108 to 110. Lines 106 and 107 can be any suitable communications medium.

In the preferred embodiment described herein, lines 106 and 107 are two-wire private line voice-grade channels. Primary switch 101 and secondary switch 102 may be remote from central station 100, in which case lines 106 and 107 would be routed through central exchanges. The addressable switches may be local to the remote terminals which they serve so that lines 108 through 110 may be two-wire loops directly connected between the remote terminals and the addressable switches. Central station 100 and remote terminals 103 through 105 may be designed to perform a variety of functions such as credit checking or alarm polling. The invention described herein is not limited, however, to any particular application to which the central station and remote terminals may be directed.

In the preferred embodiment of the invention described herein, central station 100 transmits a multibit control word to primary switch 101 consisting of address bits and delay bits. In response to the address bits the primary switch operates to connect central station 100 to a remote terminal defined by the address bits (such as remote terminal 105) by connecting line 106 to line 108. The primary switch then blinds itself to subsequent control words for an interval of time defined by the delay bits. While blinded, the primary switch maintains the established signaling path (line 106 connected to line 108) between the central station and the addressed remote terminal, allowing communication between them. At the completion of the delay interval, the primary switch breaks the established signaling path and unblinds itself in preparation for subsequent control words. In the specific embodiment of the invention described herein, communication sequences between the central station and the remote terminal occurs for durations of less than 4 seconds. Therefore, the delay interval described herein is limited to less than four seconds although in general the delay interval can be of any length.

Remote terminals, such as remote terminals 103 and 104, are accessed by utilizing the switches in a tandem arrangement. The central station sends a first control word which will operate primary switch 101 to connect central station 100 to secondary switch 102 via lines 106 and 107. While the primary switch is blinded, central station 100 will transmit a second control word to secondary switch 102 which will operate to establish a connection between line 107 and the addressed remote terminal. Thereafter, the secondary switch will blind itself and both switches will maintain the established signaling paths to allow communication between the central station and the addressed remote terminal. At the end of their respective delay intervals (the secondary switch delay interval is less than the primary switch delay interval), the addressable switches will break the signaling paths and unblind themselves in preparation for subsequent control words.

Figure 2:
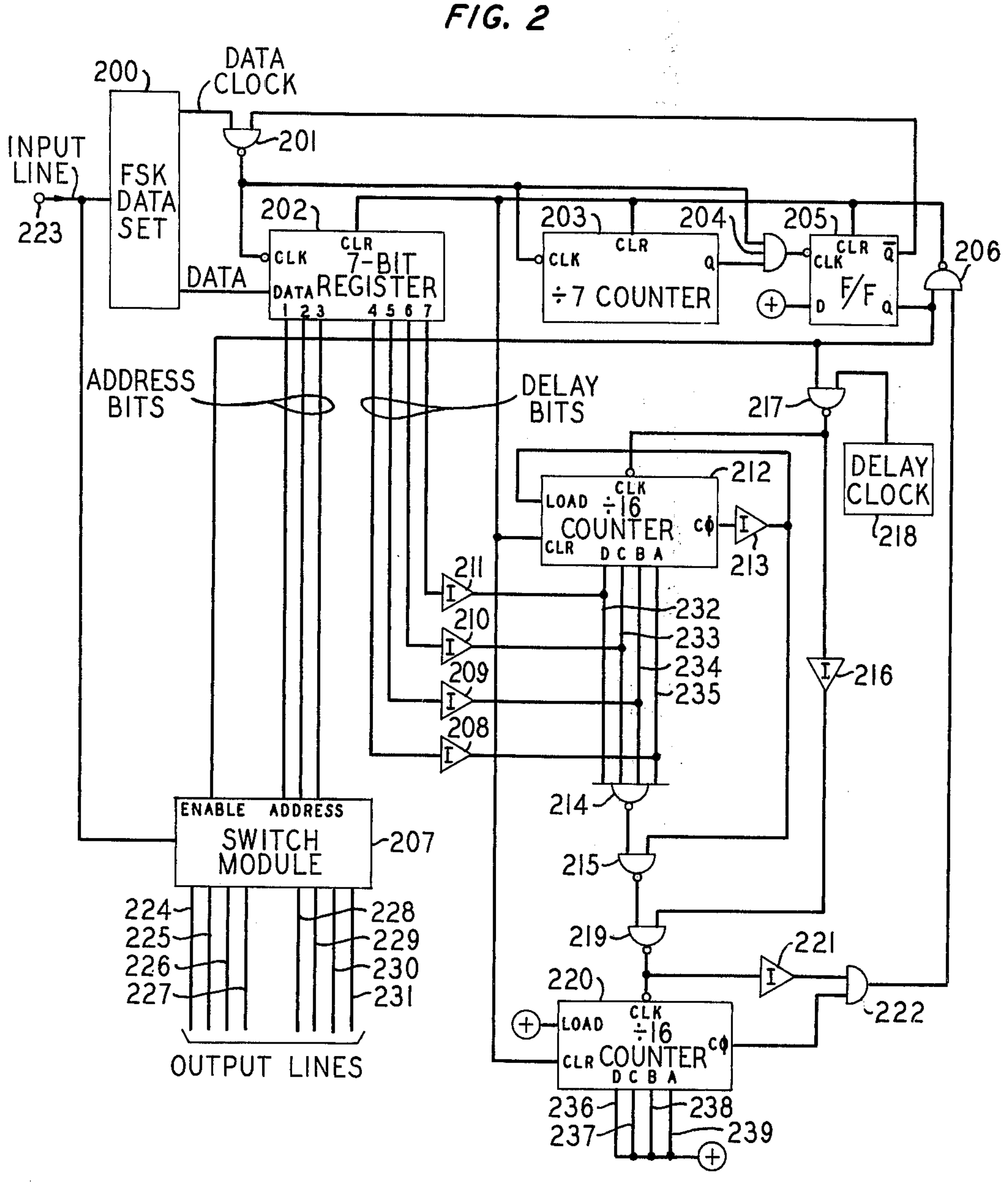
FIG. 2 discloses, in schematic form, the various circuits which form an addressable switch.

Refer to FIG. 2. Therein is shown the details of primary addressable switch 101. As both primary switch 101 and secondary switch 102 are identical, only the details of primary switch 101 will be described.

In the preferred embodiment of the invention, communication between the central station and the remote terminals is achieved using FSK (Frequency Shift Keying) signaling. Therefore, included within the addressable switch is FSK data set 200. Such data sets are well known and data set 200 could, for example, be Bell System Data Set 202, or its equivalent. Data set 200 demodulates the incoming FSK signals from central station 100 on terminal 223 and recovers therefrom a clock signal and a data signal with the frequency of the clock signal being equal to the frequency of the data signal.

The incoming signals on terminal 223 are also passed to switch module 207. Switch module 207 is a commercially available digital integrated circuit such as General Instrument AY-6-4016 Double Pole, Eight Position Switch. Under the control of three address bits and an enable signal, switch module 207 will selectively connect input terminal 223 to one of the output lines 224 through 231, as defined by the address bits.

Delay clock 218 is a free running clock and can be a standard bistable multivibrator. The frequency of delay clock 218 is determined by the maximum interval of time that is desired to blind addressable switch 101.

Counters 212 and 220 are commercially available integrated circuits such as Signetics Programmable Counter NE 74161. The counters are cleared by applying a logical 0 to their CLEAR inputs and advanced by applying clock pulses to their CLK inputs. Each counter functions as a standard divide-by-sixteen binary counter when a logical 1 is applied to its LOAD input. When a logical 0 is applied to its LOAD input, the logic states present on lines 232 through 235, or lines 236 through 239 are loaded into the A-D inputs of the counters. This has no effect on the counter's Cφ output but programs the counter so that it will begin counting at the logic state defined by the logical value of the A–D inputs when clock pulses are applied to the CLK input. For example, if $1000_2$ is loaded into the counter, the next clock pulse will move the counter to $1001_2$, regardless of its previous state. When the counter reaches the state of $1111_2$, the Cφ output goes high (high = logical 1, low = logical 0) and remains high until the counter is advanced or cleared.

Counter 203 is a standard divide-by-seven counter. It is cleared by a logical 0 applied to the CLEAR input. The Q output goes high when the counter reaches the logic state $111_2$.

Register 202 is a standard 7-bit shaft register cleared by a logical 0 applied to the CLEAR input. The Q output of each stage in the register is available on outputs 1–7.

In general, incoming FSK signals representing control words are received on input terminal 223 and applied to data set 200 and switch module 207. Switch module 207 is disabled at this time (ENABLE input = logical 0) and ignores the FSK signals. Data set 200 demodulates the FSK signals and recovers therefrom a baseband clock signal and a 7-bit baseband control word consisting of three address bits and four delay information bits which is stored in register 202. The storage of the control word in register 202 is detected by counter 203. In response thereto, the switch is blinded by rendering register 202 unresponsive to subsequently received data words, switch module 207 is enabled, and the advancing of counter 212 is begun thereby commencing the delay interval. The manner in which this is accomplished will be detailed hereinafter.

The three address bits stored in register 202 are applied to switch module 207. Therefore, when the switch module is enabled, a signaling path is established between input terminal 223 and one of output lines 224–231 identified by the three address bits. This signaling path will be maintained until the conclusion of the delay interval thereby allowing communication between the central station and a selected remote terminal (or the secondary switch) for the delay interval duration.

The four delay information bits are inverted and applied to the A–D inputs of counter 212. Counters 212 and 220 determine the duration of the delay interval. This is accomplished by programming counter 212 to a start count state defined by the inverted value of the delay information bits. Counter 212 is advanced by the delay clock signal from this programmed start count state to a fixed stop count state. In response thereto, counter 220 is advanced one count by the delay clock signal and counter 212 is reset to the start count state. Counter 212 is again advanced to the stop count state and counter 220 is advanced one more count. This process continues until counter 220 reaches the fixed stop count state thereby signaling the conclusion of the delay interval. In response thereto, switch module 207 is disabled, breaking the signal path, and register 202 is unblinded in preparation for subsequent control words.

The operation of the primary switch will now be considered in detail. The data clock signal received by data set 200 is applied to gate 201 and the control word recovered from data set 200 is applied to the DATA input of register 202. Flip-flop 205 is normally clear, enabling gate 201. Therefore, the clock signal is applied to 7-bit register 202, divide-by-seven counter 203, and gate 204. The clock signal clocks the 7-bit control word into register 202 and simultaneously advances counter 203. When the complete control word is stored in register 202 (address bits in positions 1–3, and delay bits in positions 5–7), counter 203 reaches the count of $111_2$, causing its Q output to go high, thereby enabling gate 204 and allowing the clock signal to toggle flip-flop 205 to the SET position.

Setting flip-flop 205 causes its $\overline{Q}$ output to go low, disabling gate 201. Therefore, clock signals are blocked from register 202, counter 203 and gate 204. Blocking the clock signals from register 202 prevents the storage of any new information therein. This blinds the addressable switch to all information from the central station and the switch will remain blinded until flip-flop 205 is cleared.

The Q output of flip-flop 205 is now high, and is applied to the inputs of gate 217, disabled gate 206 (the output of gate 222 is normally low), and the ENABLE lead of switch module 207. The high on the ENABLE lead places switch module 207 under the control of the three address bits stored in register 202. In response thereto, the switch module will connect input terminal 223 to the output line (224–231) defined by the address bits. This establishes a signal path connection between the central station and the selected remote terminal (or secondary switch) and the path will remain intact until the addressable switch is unblinded and a new control word is decoded.

The four delay information bits stored in register 202 are also applied via inverters 208–211 to the A through D inputs of counter 212. Gate 217 was enabled by the Q output of flip-flop 205 going high, allowing the delay clock signal from clock 218 to be applied to the CLOCK input of counter 212 and the input of gate 219 via inverter 216. Counter 212 is normally cleared and its Cϕ output is low, the output of inverter 213 is high and a logical 1 is applied to the LOAD input of counter 212. The counter is therefore functioning as a normal divide-by-sixteen counter. Assume now that the inverted value of the delay information bits is other than $1111_2$. (The result of this delay state will be obtained hereinafter.) The output of gate 214 is therefore high as is the output of inverter 213. Therefore the output of gate 215 is low, disabling gate 219, and blocking the delay clock pulses from counter 220. Only counter 212 therefore begins counting in response to the delay clock signal.

Upon reaching the count state $1111_2$, the Cϕ output of counter 212 goes high and the output of inverter 213 goes low. Therefore, a logical 0 is applied to the input of gate 215 and to the LOAD input of counter 212. A logical 0 on the LOAD input causes the four delay information bits (inverted) to be loaded into the A–D inputs of counter 212. This programs the counter to a start count state defined by the logical value (inverted) of the four delay bits and the counter will begin counting at this state with the next clock pulse.

Applying a logical 0 to one input of gate 215 causes its output to go high. This enables gate 219 and allows the next clock pulse from delay clock 218 via inverter 216 to be applied to the clock input of counter 220. (Counter 220 is normally cleared and hard wired to function as a divide-by-sixteen counter as the LOAD input is tied high.) Simultaneously, a delay clock pulse is applied to counter 212. Therefore, counter 220 is advanced to the logic state $1_2$ and the counter 212 is advanced one count beyond the logical value of the start count state.

As counter 212 has been advanced, it is no longer at the logical state $1111_2$. Therefore, the Cϕ output of counter 212 goes low, the output of inverter 213 goes high, and the output of gate 215 goes low, thereby disabling gate 219. This blocks additional delay clock pulses from counter 220. Counter 212 will continue to be advanced by the delay clock. Upon again reaching the logical state $1111_2$, counter 212 will be reprogrammed to the start count state as previously described, and counter 220 will be advanced one more count to logical state $10_2$. In this manner, counter 212 will continue to be recycled and the counter 220 will continue to be advanced until counter 220 reaches the logical state $1111_2$.

When counter 220 reaches the logical state $1111_2$, its Cϕ output goes high, applying a high to one input of gate 222. Counter 212 will then complete one additional count cycle. When counter 212 again reaches the counter $1111_2$, it Cϕ output goes high, the output of inverter 213 goes low and the output of gate 215 goes high, enabling gate 219. The next delay clock pulse is applied to gate 219 via gate 217 and inverter 216. The delay clock pulse is inverted by gate 219 which applies a low to the input of inverter 221 which, in turn, applies a high to one input of gate 222. As counter 220 is still at logical state $1111_2$, its Cϕ output is high, which applies a high to the remaining input of gate 222. Therefore, gate 222 is enabled and applies a high to the input of gate 206. This signals the conclusion of the delay interval. At this time flip-flop 205 is still in the SET condition, which applies a high to the remaining input of gate 206. Therefore when gate 222 is enabled, the output of gate 206 goes low, clearing flip-flop 205, register 202 and counters 203, 212 and 220. Clearing flip-flop 205 disables switch module 207 and enables gate 201. Therefore, the previously established connection between the central station and the addressed remote terminal is broken and the addressable switch is unblinded in preparation for the processing of subsequent control words.

Operation of the addressable switch for the delay state $1111_2$ will now be discussed. Delay station $1111_2$ is the minimum amount of delay available. To achieve minimum delay, counter 220 is driven directly by the delay clock. Recall that when the control word is completely stored in register 202, flip-flop 205 is set, enabling gate 217 and allowing the delay clock waveform to be applied to counter 212 and inverter 216. At this time, if the delay bits (inverted) are equal to $1111_2$, the output of gate 214 is low. Therefore, the output of gate 215 is high, enabling gate 219 and allowing counter 220 to be directly clocked by the delay clock. Counter 220, which was previously cleared, will be advanced to logical state $1111_2$, at which time gate 222 will be enabled in the manner previously described. This will then signal the conclusion of the delay interval as described above.

The delay interval provided by the addressable switch depends on the frequency of the delay clock and the logical value of the delay bits. In the preferred embodiment described herein, the delay clock frequency is 64 Hz. At this frequency, delay state $1111_2$ provides the minimum delay of one-quarter second. This delay interval results as counter 220 is directly clocked to a count of 16, i.e., 16 counts/64 Hz = ¼ second. Similarly, delay state $0000_2$ provides the maximum delay of 4 seconds. This delay interval results as counter 220 is clocked in response to counter 212 and counter 212 must be recycled 16 times before counter 220 reaches the count of 16, i.e., (16 × 16)counts/64 Hz = 4 seconds.

While a particular embodiment of the invention has been shown and described, it will, of course, be understood that various modifications may be made without departing from the true spirit and scope of the invention. The appended claims are, therefore, intended to cover any such modification.

I claim:

1. A switching circuit, including addressable switch means responsive to the reception of a multibit control word on a signaling path from a central station for extending the signaling path to a selected remote location, the signaling path being capable of carrying information between the central station and the selected remote location, characterized in that the switching circuit further includes, timing means responsive to signals on the signaling path and operative upon the reception of the multibit control word for blinding the switch means to the multibit control words for a delay interval, and means responsive to the timing means for maintaining the extended signaling path throughout the delay interval duration, whereby information may be carried between the central station and the selected remote location for the duration of the delay interval.

2. A switching circuit in accordance with claim 1 further including means for detecting the termination of the delay interval, the maintaining means including means responsive to the detecting means for breaking the signaling path and the timing means including means responsive to the detecting means for unblinding the switch means.

3. A switching circuit in accordance with claim 1 wherein the multibit control word includes delay bits, the timing means including means responsive to bit permutations of the delay bits for defining the duration of the delay interval.

4. A switching circuit, in accordance with claim 3, wherein the timing means further includes means responsive to the multibit control word for counting from a start count state defined by the delay bits to a fixed stop count state and means for advancing the counting means at a predetermined rate, whereby the delay interval is equal in time to the time required for the counting means to advance from the start count state to the fixed stop count state.

5. A switching circuit for completing a signaling path between a central station and a selected one of a plurality of remote terminals, including means responsive to a multibit control word carried on the signaling path from the central station for operating the switching circuit, characterized in that the switching circuit further includes, means responsive to the multibit control word for determining a duration of a variable delay interval, and means responsive to the determining means for blinding the operating means to signals on the signaling path for the determined delay interval duration.

6. A switching circuit, in accordance with claim 5, wherein the multibit control word includes delay bits and address bits, the determining means including means responsive to bit permutations of the delay bits for defining the duration of the variable delay interval, and the operating means including means responsive to bit permutations of the address bits for selecting the remote terminal.

7. A switching circuit in accordance with claim 6 wherein the determining means includes counting means driven by a delay clock of predetermined frequency, means for presetting the counting means to a start count state determined by the delay bits, and means for detecting a predetermined stop count state, whereby the defined delay interval is the time required for the counting means to advance from the start count state to the predetermined stop count state.

8. A switching circuit in accordance with claim 7 wherein the operating means includes means responsive to the determining means for breaking the signaling path at the termination of the delay interval.

9. A switching circuit, in accordance with claim 8, further including means for detecting the arrival of the control word from the central station, the operating means, the determining means and the blinding means being simultaneously enabled in response to the detecting means.

10. A switching circuit, including a primary switch and a secondary switch, the primary switch including means responsive to a first multibit control word on a signaling path from a central station for extending the signaling path to the secondary switch, the secondary switch including means responsive to a second multibit control word on the signaling path from the central station for extending the signaling path to a selected one of a plurality of remote terminals, characterized in that the switching circuit further includes means included in the primary switch responsive to the first multibit control word for blinding the primary switch to signals on the signaling path for a first delay interval, and means included in the secondary switch responsive to the second multibit control word for blinding the secondary switch to signals on the signaling path for a second delay interval, the second delay interval occurring subsequent to the commencement of and prior to the conclusion of the first delay interval.

11. A switching circuit, in accordance with claim 10, wherein the primary switch blinding means are operative upon the reception of the first multibit control word from the central station, the primary switch further including means for maintaining the extended signaling path throughout the first delay interval, whereby the second multibit control word from the central station is transmitted to the secondary switch during the interval in which the primary switch is blinded to signals on the signaling path.

12. A switching circuit in accordance with claim 11 wherein the extended signaling path carries data words between the central station and the remote terminal, the secondary switch blinding means being operative upon the reception of the second multibit control word from the central station, the secondary switch further including means for maintaining the extended signaling path throughout the second delay interval, whereby information is interchanged between the central station and the remote terminal during the interval in which both the primary and secondary switches are blinded to signals on the signaling path.

13. A method for polling a selected one of a plurality of remote locations from a central station comprising the steps of, transmitting a control word defining a remote location to a signaling path connected to the central station, extending the signaling path to a selected one of the remote locations defined by the control word, maintaining the extended signal path independent of all words transmitted thereon subsequent to the control word, and terminating the extended signal path after a determined interval duration.

14. A method for polling in accordance with claim 13 wherein the control word further defines a delay interval and the terminating step includes the steps of determining the delay interval defined by the control word and opening the extended signal path at the conclusion of the duration of the delay interval.

15. A method for accessing a selected one of a plurality of remote terminals from a central station, comprising the steps of, transmitting a first control word on a signaling path from the central station to a primary addressable switch, extending the signaling path to a secondary addressable switch in response to the first control word, maintaining the extended signal path to the secondary switch independent of all words transmitted thereon subsequent to the first control word for a first delay interval, transmitting a second control word on the signaling path from the central station to the secondary addressable switch, extending the signaling path to the selected terminal in response to the second control word, and, maintaining the extended path to the selected terminal independent of all words transmitted thereon subsequent to the second control word for a second delay interval, the second delay interval occurring subsequent to the commencement of and prior to the termination of the first delay interval.

* * * * *